No. 806,316. PATENTED DEC. 5, 1905.
C. E. BERTELS.
TRANSMISSION MECHANISM.
APPLICATION FILED MAY 31, 1905.

2 SHEETS—SHEET 1.

Witnesses
Charles E. Bertels, Inventor,
by
Attorneys

No. 806,316. PATENTED DEC. 5, 1905.
C. E. BERTELS.
TRANSMISSION MECHANISM.
APPLICATION FILED MAY 31, 1905.

2 SHEETS—SHEET 2.

Witnesses
E. J. Stewart
C. N. Woodward

Charles E. Bertels, Inventor.
by C. A. Snow & Co
Attorneys

UNITED STATES PATENT OFFICE.

CHARLES E. BERTELS, OF WILKESBARRE, PENNSYLVANIA.

TRANSMISSION MECHANISM.

No. 806,316. Specification of Letters Patent. Patented Dec. 5, 1905.

Application filed May 31, 1905. Serial No. 263,037.

*To all whom it may concern:*

Be it known that I, CHARLES E. BERTELS, a citizen of the United States, residing at Wilkesbarre, in the county of Luzerne and State of Pennsylvania, have invented a new and useful Transmission Mechanism, of which the following is a specification.

This invention relates to the transmission mechanism of motor-vehicles, and has for its object to improve the construction and increase the efficiency of devices of this character and provide means whereby the transmission-gearing is temporarily disconnected from the driven mechanism and also from the mechanism for producing momentum when the latter is employed during the time the speed-changing mechanism is in operation to prevent breakage by the accidental engagement of rapidly-moving parts.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 1:
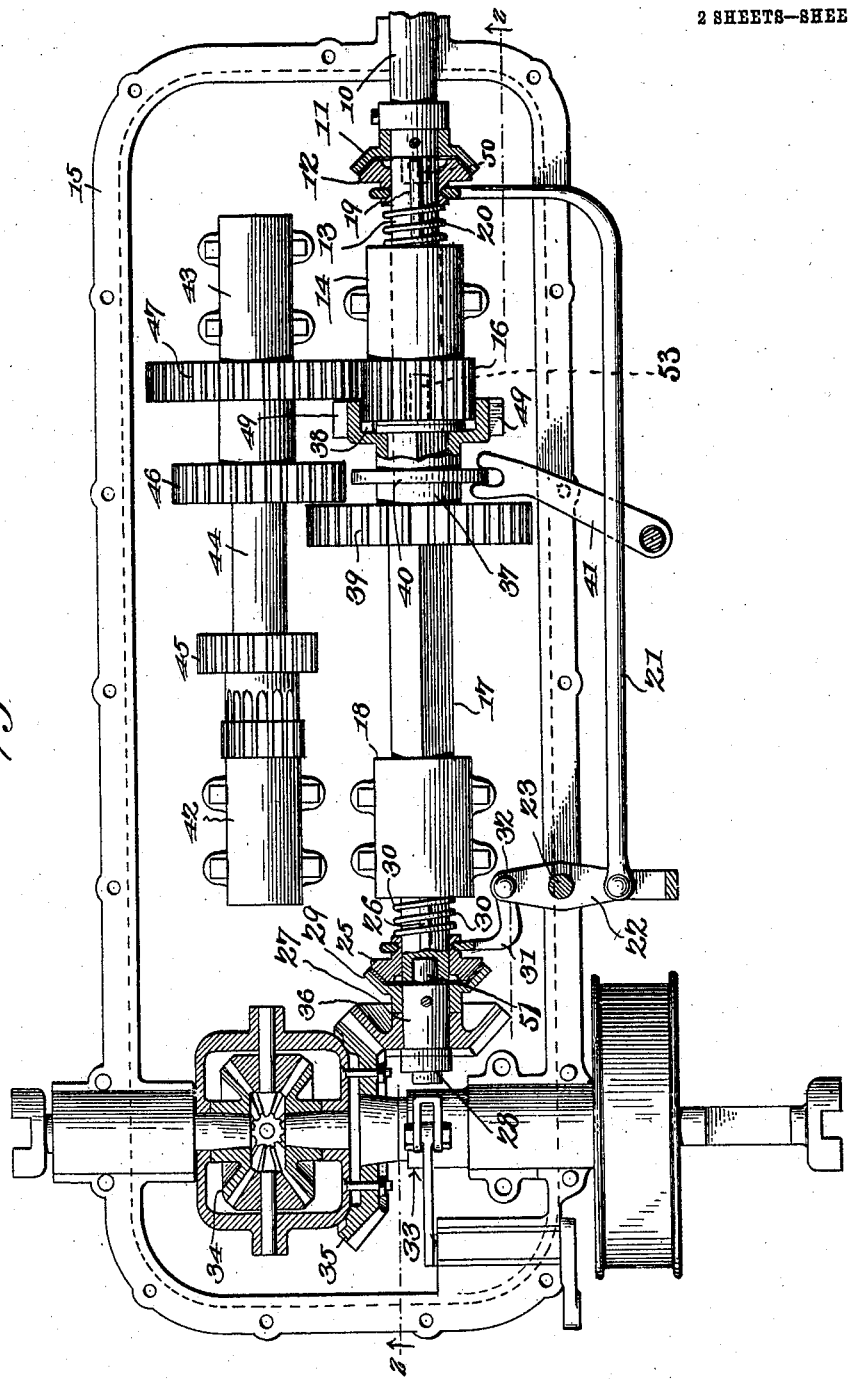
Figure 2:
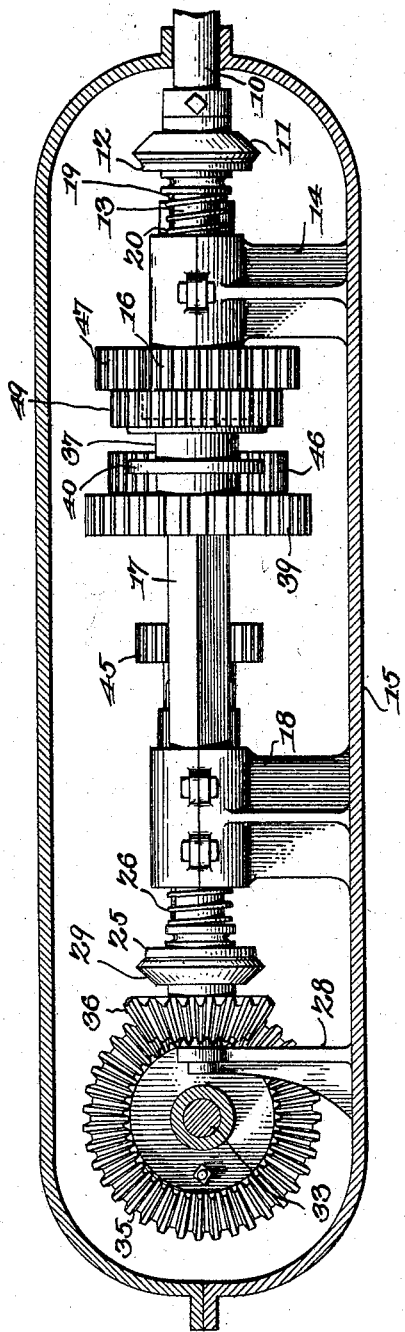

In the drawings thus employed, Figure 1 is a plan view, partially in section, of a portion of the transmission and speed-changing mechanism of a motor-vehicle with the improvement applied. Fig. 2 is a longitudinal section on the line 2 2 of Fig. 1.

In motor-vehicles having speed-changing mechanism as heretofore constructed a clutch or like device is disposed between the speed-changing mechanism and the motor, and which is actuated to disconnect the motor when the speed-changer is to be actuated; but this opening of the clutch does not disconnect the driven mechanism from the speed-changer. Hence the momentum caused by the motion of the vehicle is to be considered when the speed-changer is to be operated and often causes the breakage of parts by the sudden contact of the speed-changer with the rapidly-moving parts of the driven gearing. To obviate this objection and provide means whereby the driven mechanism may be disconnected from the speed-changing mechanism at the same time that the speed-changing mechanism is disconnected from the motor is the principal object of the present invention, which consists in interposing a suitably-constructed clutch means between the driven mechanism and the speed-changing mechanism and provided with means whereby the same may be actuated by the operator, preferably by the foot.

The invention further consists in connecting means between the two clutches above referred to whereby they are simultaneously operated.

The clutch may be of any suitable form, but will preferably be of the friction class, and will generally be located between the differential-gearing portion of the driven mechanism and the speed-changing mechanism.

The improved device may be applied to any of the various constructions of motor-vehicles by making slight and immaterial modifications in some of the parts, but for the purpose of illustration is shown applied to a conventional structure of this class.

The main drive-shaft is represented at 10 and a portion of the driven shaft at 27, the latter coupled by gears 36 and 35 and differential gear 34 to the axle of a vehicle. The shafts 10 and 27 are arranged in longitudinal alinement, with their inner ends spaced apart, the shaft 10 mounted for rotation in an inclosing casing 15 and the shaft 27 mounted for rotation in a standard 28, rising from the floor or lower side of the casing. Disposed between the inner ends of the shaft members 10 and 27 are two intermediate shaft-sections 13 and 17, the outer end of the section 13 bearing against the inner end of the drive-shaft 10 and the outer end of the shaft-section 17 bearing against the driven shaft 27, while the adjacent ends of the shaft-sections 13 17 bear against each other. The inner ends of the drive-shaft 10 and driven shaft 27 are provided with studs (indicated, respectively, at 50 51) for entering corresponding sockets in the intermediate shaft-sections 13 17, while a similar stud 53 on the shaft-section 13 enters a socket in the shaft-section 17. The shaft-section 13 is further supported by a standard 14, rising from the floor of the casing 15, while the shaft-section 17 is supported by a like standard 18, as shown. By this simple arrangement the main driving-shaft, the driven shaft, and the two-part intermediate shaft are disposed in longitudinal alinement and end to end and mutually supported in position, while at the same time independently rotative.

The drive-shaft 10 is provided with a clutch member 11, while the driven shaft 27 is provided with a similar clutch member 29, which is preferably integral with the gear 36. The intermediate shaft-section 13 is provided with a slidable clutch member 12, coacting with the clutch member 11 on the shaft 10, and a similar clutch member 25 is slidably disposed upon the intermediate shaft-section 17. The clutch member 12 is slidable upon the shaft-section 13 and rotative therewith by a feather or spline 19 and held in operative contact with the member 11 by a spring 20 bearing against the standard-bearing 14 and operative by a shifter-arm 21, connected to a shifter-lever 22, the latter pivoted at 23 to the casing 15. The shaft-section 17 overhangs the standard-bearing 18 and is provided upon this overhanging portion with a clutch member 25, slidable upon the shaft and held from turning thereon by a feather or spline 26. An opposing clutch member 29 is attached to the shaft-section 27 for operation against the clutch member 25, the member 25 held in operative engagement with the member 29 by a spring 30 and operated by a shifter-arm 31, pivoted at 32 to the shifter-lever 22, the pivot 23 of the latter being located intermediate the ends of the lever, so that when the lever is actuated the two clutch members 12 and 25 will be simultaneously opened and closed, as will be obvious. By this arrangement when the shifter-lever 22 is released the springs 20 and 30 will hold their respective clutch members 12 25 in engagement with the opposing clutch members 11 and 29, so that the motion of the main drive-shaft 10 will be transmitted to the drive-axle, and then when the shifter-lever 22 is operated the two clutches will be simultaneously released and disconnect the portions of the apparatus between the driving-shaft and driven shaft.

The shaft-section 17 is square for a portion of its length, as shown, and slidable upon this square portion is a sleeve 37, having an internal gear 38 at one end for engaging over the pinion 16 and with a larger gear 39 at the other end, the gear member 38 also having external gear-teeth, as at 49. The sleeve 37 is provided with a flange 40, with which a shifter-lever 41 engages, so that when the shifter-lever is actuated the sleeve will be moved longitudinally of the shaft. Mounted for rotation in bearings 42 43, rising from the casing 15, is a counter-shaft 44, carrying gears 45, 46, and 47 of different diameters, the larger gear 47 for constant engagement with the pinion 16, the latter having a face wide enough to receive both the gears 38 and 47 at the same time, as shown. The gear 39 is adapted to engage the gear 45 when the sleeve 37 is moved to one end of its path, while the gear-teeth 49 are adapted to engage the gear 46 when the sleeve is moved to an intermediate point. Thus when the sleeve is at one end of its path the gear 38 will engage the gear 16 and couple the drive-shaft 10 direct to the driven shaft and its connections and operate the same at one speed, and then when the sleeve is moved to cause the gear-teeth 49 to engage the gear-wheel 46 the speed will be decreased to a degree equal to the difference is size between the gears 49 and 46, and then when the sleeve is adjusted to engage the gears 39 and 45 a still slower speed will be transmitted to the driven shaft, as will be understood.

As before stated, in devices of this character as heretofore constructed when the ordinary clutch is released the momentum of the drive-axle continues the revolution of the speed-changer mechanism, and any attempt to operate the speed-changer mechanism while this motion continues is liable to break the parts. With the introduction of the clutch members 25 29, however, and arranging for actuating the same simultaneously with the clutch members 11 12 the speed-changer mechanism is thrown out of gear with both the power-transmission shaft and the driving-axle gear and remains motionless while the speed is being changed, so that no danger exists of the breakage of the parts when the changes are made.

Having thus described the invention, what is claimed is—

1. In a device of the class described, a driving-shaft and a driven shaft spaced apart and arranged in longitudinal alinement, an intermediate mechanism including two shafts mounted for independent rotation and disposed in longitudinal alinement with said driving-shaft and driven shaft, means for connecting and disconnecting said intermediate shafts, a clutch element between said driving-shaft and one of said intermediate shafts, a clutch element between said driven shaft and the other of said intermediate shafts, and speed-changing mechanism associated with said intermediate shafts.

2. In a device of the class described, a driving-shaft, a driven shaft, an intermediate mechanism including two shafts mounted for independent rotation, a gear upon one of said intermediate shafts, a sleeve slidable upon the other of said intermediate shafts and provided with an internal gear for engagement with and disengagement from said shaft-gear, a clutch element between said driving-shaft and one of said intermediate shafts, a clutch element between said driven shaft and the other of said intermediate shafts, and speed-changing mechanism associated with the gearing upon said intermediate shafts.

3. In a device of the class described, a driving-shaft, a driven shaft, an intermediate mechanism including two shafts mounted for independent rotation, a gear upon one of said intermediate shafts, a sleeve slidable upon the other of said intermediate shafts and having spaced external gears and with an internal gear for engagement with and disengagement from said shaft-gear, a clutch element between said driving-shaft and one of said intermediate shafts, a clutch element between said driven shaft and the other of said intermediate shafts, and speed-changing mechanism associated with the external gears of said sleeve.

4. In a device of the class described, a driving-shaft, a driven shaft, an intermediate mechanism including two shafts mounted for independent rotation, a clutch element between said driving-shaft and one of said intermediate shafts, a clutch element between said driven shaft and the other of said intermediate shafts, a gear upon one of said intermediate shafts, a sleeve slidable upon the other of said intermediate shafts and having spaced external gears and with an internal gear for engagement with and disengagement from said shaft-gear, a counter-shaft, a gear carried by said counter-shaft and in constant engagement with the shaft-gear, and spaced gears upon said counter-shaft for engagement with and disengagement from the external gears of said sleeve.

5. In a device of the class described, a driving-shaft, a driven shaft, two intermediate shafts arranged end to end between said driving-shaft and driven shaft, spaced bearings respectively supporting said intermediate shafts, a clutch member carried by said driving-shaft, an opposing clutch member slidable upon one of said intermediate shafts for engagement with the clutch member of said driving-shaft, a spring-bearing between said slidable clutch member and the adjacent shaft-bearing, a clutch member carried by said driven shaft, an opposing clutch member slidable upon the other of said intermediate shafts for engagement with the clutch member of said driven shaft, a spring-bearing between said last-mentioned slidable clutch member and the adjacent shaft-bearing, means for simultaneously operating said slidable clutch members, and speed-changing mechanism associated with said intermediate shafts.

In testimony that I claim the foregoing as my own I have hereto affixed my signature in the presence of two witnesses.

CHARLES E. BERTELS.

Witnesses:
NELLIE MURPHY,
W. C. ZIEGRUFUS.